United States Patent
Lee et al.

(10) Patent No.: US 11,544,382 B2
(45) Date of Patent: Jan. 3, 2023

(54) REGULATING MESSAGES WARNING ABOUT IMPACTS OF FIRMWARE CHANGES

(71) Applicant: HEWLETT PACKARD ENTERPRISE DEVELOPMENT LP, Houston, TX (US)

(72) Inventors: Terry Ping-Chung Lee, Roseville, CA (US); Kenneth J. Geer, Roseville, CA (US); Shiva R. Dasari, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 259 days.

(21) Appl. No.: 17/084,092

(22) Filed: Oct. 29, 2020

(65) Prior Publication Data
US 2022/0138324 A1    May 5, 2022

(51) Int. Cl.
*G06F 21/57*    (2013.01)
*H04L 9/08*    (2006.01)

(52) U.S. Cl.
CPC .......... *G06F 21/572* (2013.01); *H04L 9/0877* (2013.01); *G06F 2221/034* (2013.01)

(58) Field of Classification Search
CPC .................... G06F 21/572; G06F 2221/034
See application file for complete search history.

(56) References Cited

U.S. PATENT DOCUMENTS

| 7,484,099 B2 | 1/2009 | Bade et al. |
| 7,991,932 B1 | 8/2011 | Choksey et al. |
| 9,851,985 B2 | 12/2017 | Martinez et al. |
| 10,193,693 B2 | 1/2019 | Tsuji et al. |
| 2019/0092105 A1* | 3/2019 | Wicher ............... B60C 23/0416 |

OTHER PUBLICATIONS

Super X8DTU-LN4F+, (Research Paper), Super Micro Computer, Inc User Manual, Mar. 24, 2010, 107 Pgs.
TCG; "Trusted Platform Module Library Part 2: Structures'", Specification, Family 2.0, Level 00, Revision 1.38; Sep. 29, 2016; 166 pp.

* cited by examiner

*Primary Examiner* — David J Pearson
(74) *Attorney, Agent, or Firm* — Trop, Pruner & Hu, P.C.

(57) ABSTRACT

A technique includes detecting a presence of a hardware security module in a computer. The hardware security module performs trusted computing base measurements in response to the boot of the computer. The technique includes detecting an intention to change firmware of the computer and regulating providing a message warning about an impact of the change based on the determination. The regulation includes determining whether an operating system of the computer binds operations to the trusted computing base measurements and allowing communication of the message based on the determination.

20 Claims, 7 Drawing Sheets

REGULATING MESSAGES WARNING ABOUT IMPACTS OF FIRMWARE CHANGES

BACKGROUND

A computer system may be subject to a security attack in which an external entity seeks to access information that is stored on the computer system or harm components of the computer system. For purposes of preventing or at least inhibiting such security attacks, the computer system may have various mechanisms to limit access, such as firewalls, passwords, keys, and so forth. The computer system may have a hardware security device, such as a trusted platform module (TPM), which may perform various cryptographic services for the computer system.

DETAILED DESCRIPTION

A computer platform, such as a server, may contain a security co-processor, or hardware security module, which performs various cryptographic services for the computer platform. As an example, the hardware security module may perform measurements of a trusted computing base (TCB) of the computer platform and store representations of these measurements in a secure memory of the hardware security module. In this context, a "trusted computing base" refers to a set of hardware, firmware and/or software components of the computer platform, which form the core of security for the system. In other words, the trusted computing base may be inherently trusted software, hardware, or some combination thereof. The TCB, in accordance with example implementations, is a combination of hardware and software used to take measurements of and to define security for the computer system.

As a more specific example, the hardware security module may be a trusted platform module (TPM), and platform configuration registers (PCRs) inside the TPM may store cryptographic hashes of TCB measurements. The hardware security module may acquire the measurements for a particular power state of the computer platform, such as, for example, when the computer platform boots up (e.g., when the computer platform powers up or is reset). In general, a "hash" or "hash value" is produced by the application of a cryptographic hash function to a value (such as a particular trust measurement). A "cryptographic hash function" may be a function comprising machine-readable instructions. The cryptographic hash function may include machine-readable instructions that, when executed by a processor, may receive an input. The cryptographic hash function may then generate a hexadecimal string to match the input. For example, the input may include a string of data (for example, the data structure in memory denoted by a starting memory address and an ending memory address). In such an example, based on the string of data the cryptographic hash function outputs a hexadecimal string. Further, any minute change to the input may alter the output hexadecimal string. In another example, the cryptographic hash function may be a secure hash function (SHA), any federal information processing standards (FIPS) approved hash function, any national institute of standards and technology (NIST) approved hash function, or any other cryptographic hash function. In some examples, instead of a hexadecimal format, another format may be used for the string.

In accordance with example implementations, the hardware security module is tamper resistant or tamper proof. As a more specific example, the hardware security module may be in the form of an integrated circuit package (or "chip") that resides on the motherboard of the computer platform and is separate from central processing units (CPUs) and CPU processing cores of the computer system. The hardware security module may be a crypto-processor (microprocessor) that is designed according to industry standards to provide hardware-based, security functions while also resisting tampering and malicious software. Examples of hardware security modules that may be used are TPMs that are commercially available from INFINEON TECHNOLOGIES and NUVOTON. Other examples of hardware security modules include a firmware-based security co-processor, such as a TPM implemented in ARM TRUSTZONE commercially available from ARM LIMITED out of Cambridge, UK or INTEL SGX commercially available from INTEL out of Santa Clara, Calif.

The operating system of the computer platform may perform operations that are bound to TCB measurements. For example, the operating system may use the TCB measurements to seal a hard disk encryption key to a particular state of the computer platform. For example, the operating system may bind a hard disk encryption key to particular PCR values of a TPM (i.e., bind the hard disk encryption key to a particular software state of the computer platform). The "sealing" refers to the TPM encrypting the hard disk encryption key to particular PCR values, such that the TPM does not otherwise unseal, or decrypt, the hard disk encryption key and provide the hard disk encryption key to the operating system if the current PCR values do not match the PCR values to which the hard disk encryption key is sealed. As another example, the operating system may bind a password that is communicated from the operating system to the basic input/output operating system (BIOS) running after a reboot to PCR values. As another example, the operating system may bind a virtual private network (VPN) key to PCR values.

The operating system may use the hardware security module for operations other than operations that are bound to TCB measurements. For example, the hardware security module may perform encryption and decryption operations, such as operations pertaining to the encryption and decryption of files; generate random numbers; compute hashes; store encryption keys, such as passwords, certificates, public keys and private keys; and so forth.

Firmware updates to the computer platform may affect the TCB measurements. In this context, a "firmware update" refers to the modification of data and/or program instructions that are stored in a non-volatile memory of the computer platform. For example, a boot image of the computer platform may be replaced, a Peripheral Component Interconnect express (PCIe) card with firmware stored on an option read only memory (ROM) may be installed in the computer platform; and so forth. Such firmware updates or modifications may potentially interrupt operation of the computer platform. For example, if the operating system of the computer platform seals a disk drive encryption key to TCB measurements, then a TPM may not unseal the hard drive disk encryption key due to current TCB measurements (after the update) being different from the TCB measurements to which the key was sealed. For this reason, a computer platform may detect the presence of the hardware security module; and when a firmware update is initiated, the computer platform (with knowledge of the presence of the hardware security module) may display a warning, or alert, message, which alerts the user that updating the firmware may impact any security functionality enabled on the computer platform. The user may then proceed (or may not) with the firmware update with knowledge of the potential impact. A potential challenge with such a message, however, is that although the computer platform may contain a hardware security module, the platform's operating system may not rely on, or use, the TCB measurements (e.g., the operating system may not bind any operation to the TCB measurements). Accordingly, although a warning message may be displayed when a user attempts to perform a firmware update, updating the firmware may not impact any security functionality. As a result, the display of the warning may needlessly have a chilling effect that discourages the user from performing firmware updates.

In accordance with example implementations that are described herein, the display of a warning message about a potential firmware update is regulated, such that, after a computer platform detects a hardware security module, the computer platform makes a further determination whether the operating system relies on TCB measurements stored in the hardware security module. If, in accordance with example implementations, the computer platform determines that the operating system does not bind any operation to the TCB measurements, then the computer platform does not display the warning message. It is noted that even though the operating system may not use the hardware security module for operations that are bound to the TCB measurements, the computer platform may still use the hardware security module for other operations. The regulation of the firmware update warning message may be particularly advantageous for a computer platform, such as a server, that has a TPM as part of its basic hardware such that the customer did not specifically select a TPM for the server.

Figure 1:
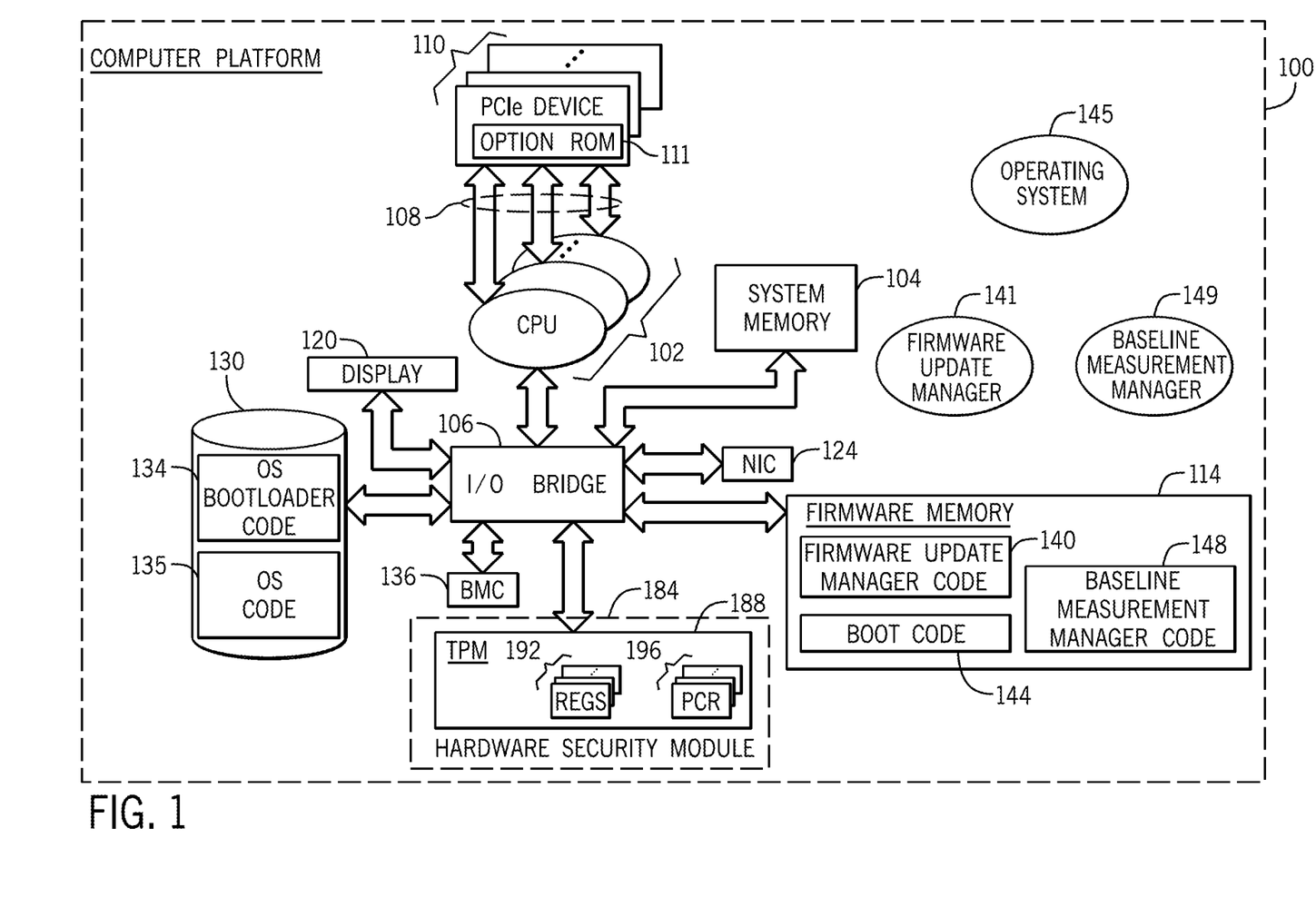
FIG. 1 is a schematic diagram of a computer platform according to an example implementation.

Referring to FIG. 1, as a more specific example, in accordance with some implementations, an electronic system may include a hardware security module 184, such as a TPM 188, for purposes of performing various cryptographic functions, or operations, for the electronic system. For the particular example of FIG. 1, the electronic system is a computer platform 100 (e.g., a server, a rack-mounted chassis module, and so forth). In accordance with example implementations, the computer platform 100 may contain a firmware memory 114 (i.e., a non-volatile memory) that stores machine executable instructions (or "firmware") and data. For example, the firmware may include firmware instructions 140 that, when executed by one or multiple CPUs 102, cause the CPU(s) 102 to form a firmware update manager 141 that may be used, for example, to update firmware of the computer platform 100; and boot code instructions 144 that is executed by one or multiple CPUs 102 for purposes of booting up the computer platform 100 at power up or reset. Moreover, as depicted in FIG. 1, the firmware memory 114 may store instructions 148 that, when executed by one or multiple CPUs 102, cause the CPU(s) 102 to form a baseline measurement manager 149 that, as further described herein, reads registers 192 of the TPM 188 for purposes of establishing baseline values, which are used to determine whether an operating system 145 of the computer platform 100 is binding operations to TCB measurements.

In general, the firmware update manager 141 controls, or regulates, updates to the firmware of the computer platform 100 and as part of this regulation, may generate data to display a warning message on a display 120 (e.g., a monitor) of the computer platform 100 when an intended firmware change may impact security functionality of the computer platform 100. In accordance with example implementations, the firmware update manager 141 may inhibit, or prevent, the displaying of the warning message in response to the firmware update manager 141 determining that the operating system 145 is not using TCB measurements acquired by and stored in the TPM 188.

As depicted in FIG. 1, in accordance with some implementations, the TPM 188 contains platform configuration registers (PCRs) 196, which store hash values, or hashes, of various trusted computing base measurements that are acquired by the TPM 188 during the boot of the computer platform 100 from power up or reset. The operating system 135 may or may not use the TCB measurements. Moreover, the TPM 188 may perform various other operations or services for the operating system 145 that do not rely on the trusted computing base measurements, such as, for example, encryption or decryption services; services involving encrypting or decrypting files; providing random numbers; providing hashes; and so forth.

For purposes of determining whether the operating system 145 is using the TCB measurements, in accordance with some implementations, the firmware update manager 141 reads values that are stored in the registers 192 of the TPM 188 and makes a determination of whether the TCB measurements are used by the operating system 145 based on these read values. Moreover, as further described herein, the determination of whether the operating system 145 is using the TCB measurements may be made based on how the read, current register values differ from their corresponding baseline values.

In accordance with example implementations, among its other features, the computer platform 100 may include memory devices that are connected to the CPU(s) 102 to form a system memory 104. The CPU(s) 102 may be coupled to an input/output (I/O) bridge 106. Moreover, as also depicted in FIG. 1, the computer platform 100 may include one or multiple PCIe devices 110 (e.g., PCIe expansion cards) that may be coupled to the CPU(s) 102 through corresponding individual PCIe bus(es) 108. In accordance with a further example implementation, the PCIe device(s) 110 may be coupled to the I/O bridge 106, instead of being coupled to the CPU(s) 102. In accordance with example implementations, the PCIe device 110 may include an option memory (called an "option ROM") 111 that stores firmware for the PCIe device 110 and may be configured through a firmware update. In general, the I/O bridge 106 may connect the CPU(s) 102 to the BMC 136, one or multiple storage devices 122, one or multiple network interface controllers (NICs) 124 one or multiple universal serial bus (USB) devices, and so forth.

In general, the memory devices that form the system memory 104, as well as other memory devices that are described herein, may be formed from non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

In accordance with some implementations, a baseboard management controller (136) may be connected to the I/O bridge 106. Moreover, as depicted in FIG. 1, in accordance with example implementations, one or multiple hard disk drives, such as hard disk drive 130, may be connected to the I/O bridge 106. For this example, the hard disk drive 130 stores operating system bootloader code 134 that may be executed by the CPU(s) 102 for purposes of loading operating system code 135 (which is execute by the CPU(s) 102 to form the operating system 145) and transferring control of the computer platform 100 to the operating system 145.

Figure 2:
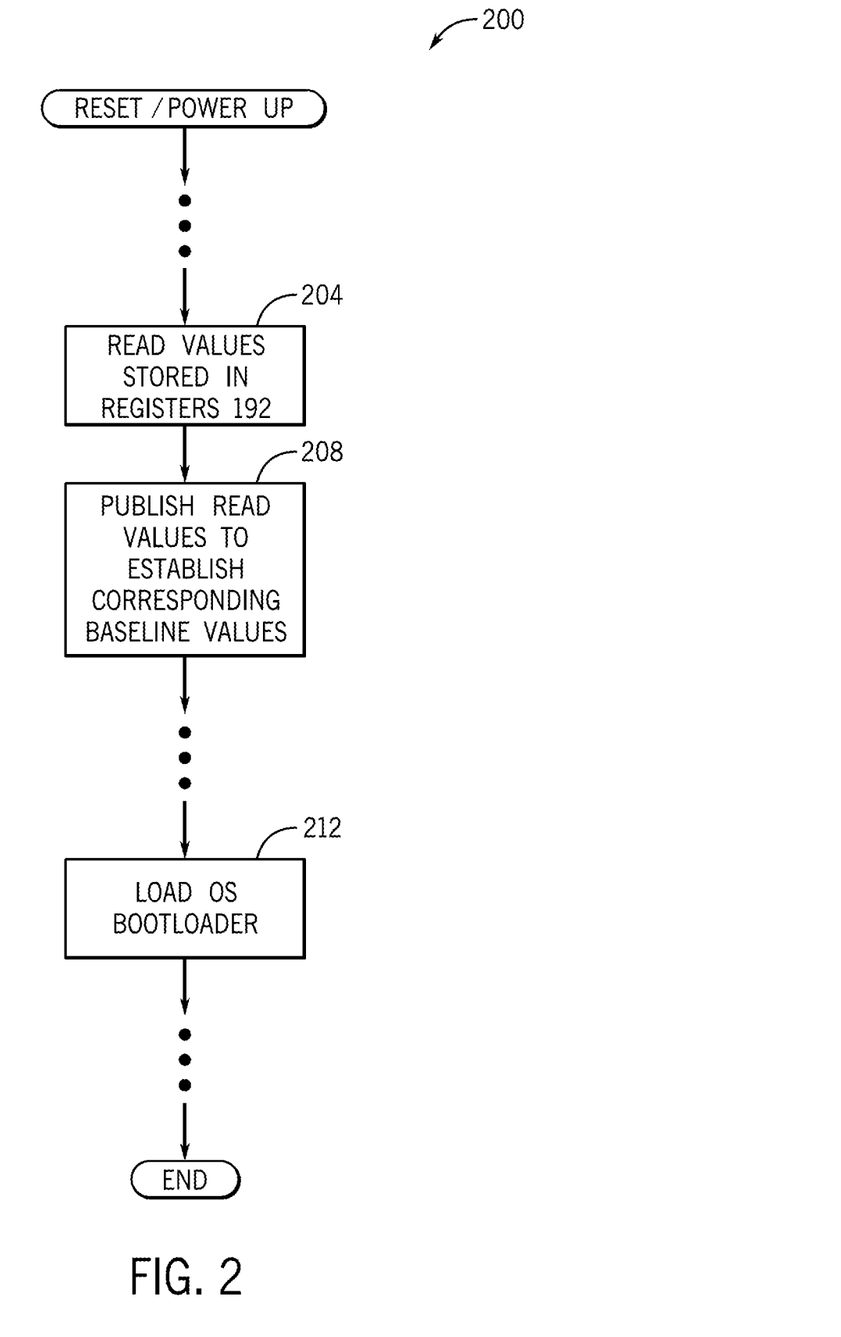
FIG. 2 is a flow diagram depicting a process to acquire and publish baseline values for registers of a trusted platform module (TPM) of the computer platform according to an example implementation.

Referring to FIG. 2, in conjunction with FIG. 1, in accordance with example implementations, the baseline measurement manager 149 performs a process 200 as part of the boot up of the computer platform 100 in response to a reset or power up of the computer platform 100. The process 200 includes the baseline measurement manager 149 reading (block 204) values that are stored in the registers 192 of the TPM 188 and publishing (block 208) the values to establish corresponding baselines for the register 192 values. Depending on the particular implementation, the mechanism to publish the register values may be an Advanced Configuration and Power Interface (ACPI), System Management BIOS (SMBIOS) or Unified Extensible Firmware Interface (UEFI) mechanism. The published register values may be retrieved by the firmware update manager 141 for purposes of comparing one or more of the register values 192 to their corresponding baseline values to determine whether the operating system 145 is using the TPM 188 to bind operations to TCB measurements. In accordance with further example implementations, the baseline measurement manager 149 and the firmware update manager 141 may be part of the same software entity (e.g., part of the same BIOS). As such, the publication of the baseline values may not be used, as the firmware update manager 141 has access to these baseline values. As part of the process 200 to boot up the computer platform 100, the OS bootloader is loaded (block 212) to load the operating system 145, and control of the computer platform 100 is then transferred to the operating system 145.

As a more specific example, in accordance with some implementations, the registers 192 may include one or more of the following registers that are defined in the "Trusted Platform Module Library Part 2: Structures" Specification, Family 2.0, Level 00, Revision 1.38, Sep. 29, 2016. The registers 192 may include a TPM_PT_HR_LOADED register, which stores a value that represents the number of authorization sessions that are currently loaded into a volatile memory of the TPM 188. In accordance with example implementations, the firmware update manager 141 may determine whether the number of authorization sessions have increased from the corresponding baseline number, and if so, the firmware update manager 141 may determine that the operating system 145 is using the TPM 188 to bind TCB measurements to operations of the operating system 145.

As another example, one of the registers 192 may be a TPM_PT_HR_LOADED AVAIL register, which stores a value that represents the number of additional authorization sessions (of any type), which may be loaded into the volatile memory of the TPM 188. It is noted that the value of additional authorization sessions may be an estimate. If the value is at least one, then at least one authorization session (of any type) may be loaded into the volatile memory of the TPM 188. In accordance with example implementations, any command that changes the memory allocation of the TPM volatile memory invalidates this estimate. Moreover, it is noted that, in accordance with example implementations, a valid implementation may return a "1," even if more than one authorization session would fit inside the volatile memory. In accordance with example implementations, the firmware update manager 141, in response to determining that the number of additional authorization sessions have changed from the corresponding baseline, determine that the operating system 145 is using the TPM 188 to bind TCB measurements to operations of the operating system 145.

In accordance with example implementations, the registers 192 may include a TPM_PT_HR_ACTIVE register, which stores the number of active authorization sessions that are currently being tracked by the TPM 188. This number is the summation of the loaded and saved authorization sessions. In accordance with example implementations, the firmware update manager 141 may determine that the operating system 145 is using the TPM 188 to bind TCB measurements to operations of the operating system 145 in response to the number of active authorization sessions currently being tracked being greater than the corresponding baseline number.

In accordance with example implementations, the registers 192 may include a TPM_PT_HR_ACTIVE AVAIL register, which stores a value that represents the number of additional authorization sessions (of any type) that may be created. It is noted that this value is an estimate. If the value is at least "1," then at least one authorization session (of any type) may be created. In accordance with example implementations, any command that changes the allocation of the volatile memory of the TPM 188 may invalidate the estimate. It is noted that a valid implementation may return a "1," even if more than one authorization session may be created. In accordance with example implementations, the firmware update manager 141 may determine that the operating system 145 is using the TPM 188 to bind operations to TCB measurements in response to the number of additional authorization sessions increasing relative to the corresponding baseline number.

In accordance with example implementations, the registers 192 may include a TPM_PT_HR_TRANSIENT_AVAIL register, which stores a value that represents an estimate of the number of additional transient objects that may be loaded into the volatile memory of the TPM 188. It is noted that this value is an estimate, and if the value is at least "1," then at least one object of any type may be loaded. Moreover, in accordance with example implementations, any command that changes the allocation of the TPM's volatile memory may invalidate the estimate. In accordance with example implementations, a valid implementation may return a "1," even if more than one transient object would fit into the TPM's volatile memory. In accordance with example implementations, the firmware update manager 141 may determine that the operating system 145 is using the TPM 188 to bind TCB measurements to operations of the operating system 145 in response to the estimate of additional transient objects being greater than the corresponding baseline value.

In accordance with example implementations, the registers 192 may include a TPM_PT_HR_PERSISTENT register, which stores a value that indicates the number of persistent objects that are currently loaded into the non-volatile memory of the TPM 188. The firmware update manager 141 may, in accordance with example implementations, determine that the operating system 145 is using the TPM 188 to bind operations of the operating system 145 to TCB measurements in response to the number of currently loaded persistent objects being greater than the corresponding baseline number.

In accordance with example implementations, the registers 192 may include a TPM_PT_HR_PERSISTENT AVAIL register, which stores a value that represents the number of additional persistent objects that may be loaded into the non-volatile memory of the TPM 188. In accordance with example implementations, this value is an estimate, and if the value is at least "1," then at least one object of any type may be made persistent. Moreover, in accordance with example implementations, any command that changes the allocation of the non-volatile memory of the TPM 188 may invalidate the estimate. It is noted that a valid implementation may return a "1," even if more than one persistent object may fit into the non-volatile memory. In accordance with example implementations, the firmware update manager 141 may determine that the operating system 145 is using the TPM 188 to bind TCB measurements to the operations of the operating system 145 in response to the number of additional persistent objects being greater than the corresponding baseline number.

In accordance with further example implementations, the firmware update manager 141 may determine that the operating system 145 is using the TPM 188 to bind operations to TCB measurements in response to a combination of multiple registers 192 containing current values that exceed their corresponding baseline values. For example, in accordance with some implementations, the firmware update manager 141 may make this determination in response to a certain multiple number of register values exceeding their corresponding baseline values; may make the determination in response to a single designated register 192 storing a current value that exceeds the corresponding baseline value; may make the determination in response to a weighted combination of register values exceeding a threshold derived from a combination of the corresponding baseline values; and so forth.

Referring back to FIG. 1, in accordance with some implementations, the firmware update manager 141 may determine that the operating system 145 is using the TPM 188 to bind operations to TCB measurements based on the value of one or multiple registers 192, without comparing the values to corresponding baseline values. For example, in accordance with some implementations, the firmware update manager 141 may read one or multiple registers 192 that are associated with authorization values for purposes of determining whether one or more of these authorization values have been configured.

As a more specific example, in accordance with some implementations, the firmware update manager 141 may read a value from a register 192 associated with an owner authority, and based on the value, determine whether the owner authority of the TPM 188 has been configured. If so, then, in accordance with example implementations, the firmware update manager 141 may determine that the operating system 145 is using the TPM 188 to bind TCB measurements to operations of the operating system 145.

In accordance with example implementations, the firmware update manager 141 may read a register 192 that is associated with an endorsement authority and/or a lockout authority for purposes of determining whether the endorsement authority and/or lockout authority has been configured; and if so, in accordance with example implementations, the firmware update manager 141 may determine that the operating system 145 is using the TPM to bind TCB measurements to operations of the operating system 145.

In accordance with further example implementations, the firmware update manager 141 may make this determination based on whether multiple authorization value-based registers have been configured; may base the determination by assigning weights to multiple authorization value registers, combining these weighted values and comparing the combined weighted value to a threshold; and so forth. In accordance with some implementations, the firmware update manager 141 may first determine whether one of the authorization value registers 192 has been configured; base a determination of whether the operating system 145 is using the TPM 188 to bind TCB measurements to operations of the operating system 145 on this determination of whether one or multiple registers 192 have been configured; and if a determination cannot be made on this basis, the firmware update manager 141 may proceed with comparing certain register values to corresponding baseline values.

In accordance with some implementations, the firmware update manager 141 may consider the identity of the operating system 145 for purposes of determining whether the operating system 145 is using the TPM 188 to bind operations to TCB measurements. In this manner, different operating systems may use the TPM 188 differently, and the firmware update manager 141 may adjust, or configure, detection specifics based on the operating system 145 identity. In accordance with example implementations, the firmware update manager 141 may determine the identity of the operating system 145 by examining a user configuration setting; or, as another variation, the firmware update manager 141 may determine an identity of the operating system 145 using the automatic detection by firmware from a previous boot of the computer platform 100. For example, the operating system 145 may employ an automatic provisioning policy that automatically configures the TPM owner authorization, even if the operating system 145 is not using the TPM to bind operations, such as disk encryption operations, to TCB measurements. As such, knowledge of the specific operating system identity for this example may be used to ignore the TPM owner authorization configuration.

Figure 3:
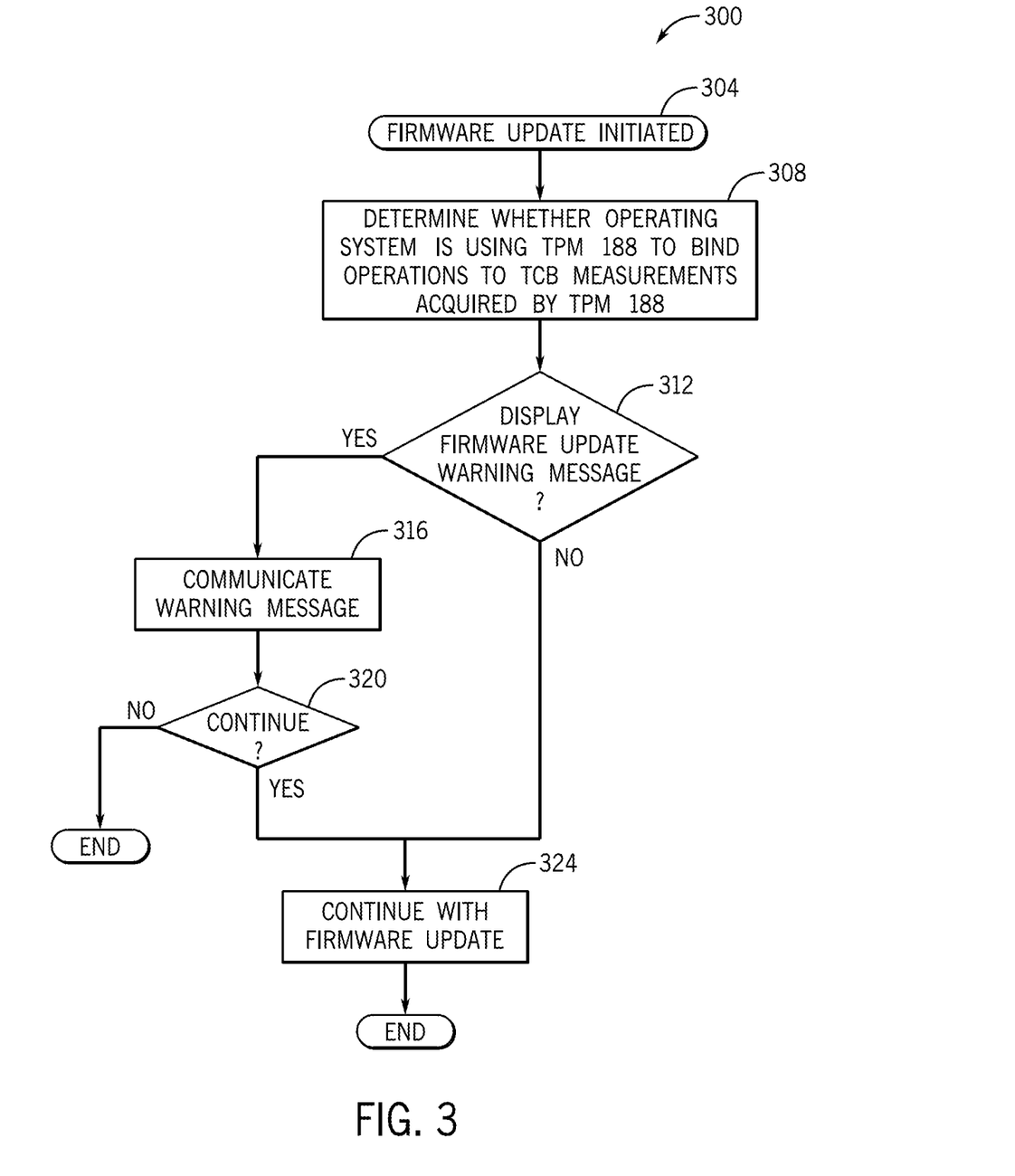
FIG. 3 is a flow diagram depicting a process to regulate the display of a firmware update warning message according to an example implementation.

Referring to FIG. 3 in conjunction with FIG. 1, in accordance with some implementations, the firmware update manager 141 performs a process 300 in response to a firmware update being initiated (as depicted at reference numeral 304). Pursuant to block 308, the firmware update manager 141 determines whether the operating system 145 is using the TPM 188 to bind operations of the operating system to TCB measurements. Next, in accordance with example implementations, the firmware update manager 141 determines (decision block 312) whether to display a firmware update warning message. In accordance with further example implementations, block 308 may be performed outside of the firmware update manager 141. For example, in accordance with further implementations, the BIOS may determine whether the operating system 145 is using the TPM 188 to bind operations to TCB measurements acquired by the TPM 188, and the result of this determination may be accessed by the firmware update manager 141.

In accordance with some implementations, the firmware update manager 141 may generate, or provide, data to cause the display (e.g., on the display 120) to alert, or warn, a user of the computer platform 100 that updating the firmware may impact or interrupt system operation or, in general, may impact security functionality enabled on the computer platform 100. The firmware update manager 141 may, however, not display the warning message in response to determining that the operating system 145 is not using the TPM 188 to bind operations to TCB measurements. In this manner, as depicted in FIG. 3, in accordance with example implementations, in response to determining (decision block 312) whether to display the firmware update warning message, the firmware update manager 141 may determine that the message is to be displayed (i.e., may make this determination based on the detected use of the TPM 188 to bind operations of the operating system 145 to TCB measurements) and communicate (block 316) the warning message (e.g., provide data to display the warning message on a display, such as the display 120). Moreover, in accordance with some implementations, the firmware update manager 141 may wait for a response (e.g., a user input entered through an input/output (I/O) device) and from this make a decision (decision block 320) whether to continue with the firmware update. If a decision is not made to continue, then the process 300 terminates, as depicted in FIG. 3. Otherwise, if the user provides input allowing the firmware update to continue or the warning message is not displayed, then the firmware update manager 141 continues with the firmware update, pursuant to block 324.

Figure 4:
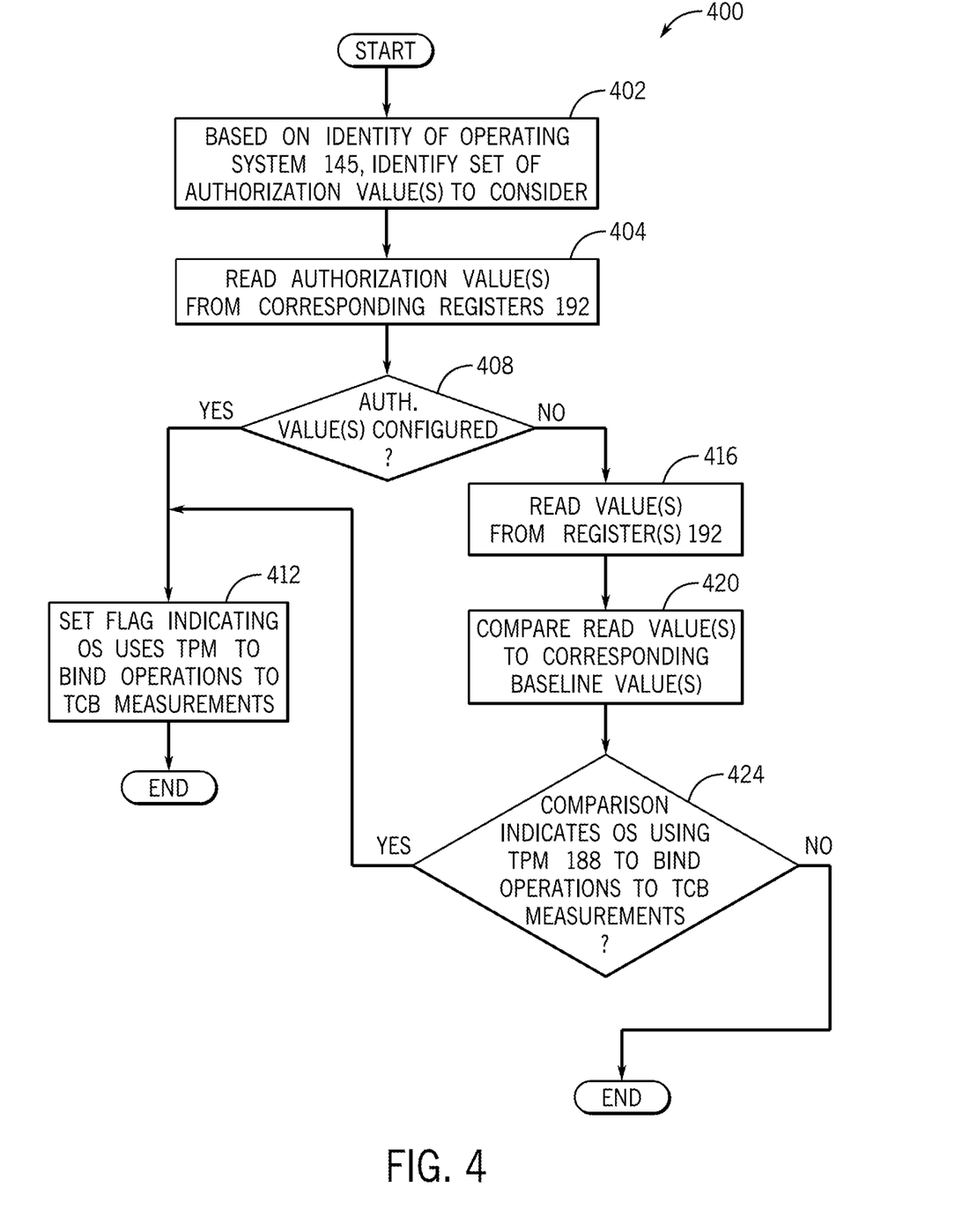
FIG. 4 is a flow diagram depicting a process to determine whether an operating system of the computer platform is binding operations to trusted computing base (TCB) measurements according to an example implementation.

Referring to FIG. 4 in conjunction with FIG. 1, in accordance with example implementations, the firmware update manager 141 may perform a process 400 for purposes of determining whether the operating system 145 is using the TPM 188 to bind operations of the operating system 145 to TCB measurements. Pursuant to the process 400, the firmware update manager 141 determines (block 402) a set of one or multiple authorization values to consider based on an operating system identity. The firmware update manager 141 then reads (block 404) one or multiple authorization values (of the identified set) from the corresponding registers 192 and from these registers, determines (decision block 408) whether the corresponding authorization value(s) has been configured. If so, then, in accordance with example implementations, this is the end of determining whether the TCB measurements are used, and the firmware update manager 141 sets (block 412) a flag indicating that the operating system 145 uses the TPM 188 to bind operations of the operating system 145 to TCB measurements.

Otherwise, if, in the first prong of the determination the firmware update manager 141 cannot determine whether the TCB measurements are being used, the firmware update manager 141 proceeds with the second prong of the determination by reading (block 416) one or multiple values from the registers 192 and comparing (block 420) the read value(s) to the corresponding baseline(s). The firmware update manager 141 then determines (decision block 424) whether the comparison indicates that the trusted computing base measurements are being used, and if so, control transitions to block 412 where the firmware update manager 141 sets the flag to indicate the use of the TCB measurements.

In accordance with further implementations, the firmware update manager 141 may consider attributes other than register values for purposes of determining whether or not the operating system 145 uses the TPM 188 to bind operations of the operating system 145 to TCB measurements. For example, in accordance with some implementations, the firmware update manager 141 may base this determination (at least in part) on determining one or multiple attributes of one or multiple persistent objects (which have been created by the operating system 145) in the TPM 188. In this context, a "persistent object" refers to a software entity, which survives a power cycling of the computer platform 100. As an example of a persistent object of the TPM 188, the operating system 145 may create a persistent object in the TPM 188 for purposes of unsealing a hard disk encryption key. Such a persistent object may, for example, unseal the hard disk encryption key to reveal or decrypt the key when the current PCR values match expected PCR values. As another example, the operating system 145 may create a persistent object in the TPM 188 for purposes of decrypting data (e.g., decrypting a hard disk encryption key stored on a disk in encrypted form). In accordance with example implementations, the firmware update manager 141 may read one or multiple persistent objects in the TPM 188 for purposes of determining attributes of the persistent objects, such as attributes that represent whether the persistent objects are being used to unseal hard disk encryption keys, decrypt data, and so forth. Based on the attribute(s) of the persistent objects and possibly other factors (e.g., register values), the firmware update manager 141 may then determine whether the operating system 145 uses the TPM 188 to bind operations of the operating system 145 to TCB measurements.

Figure 5:
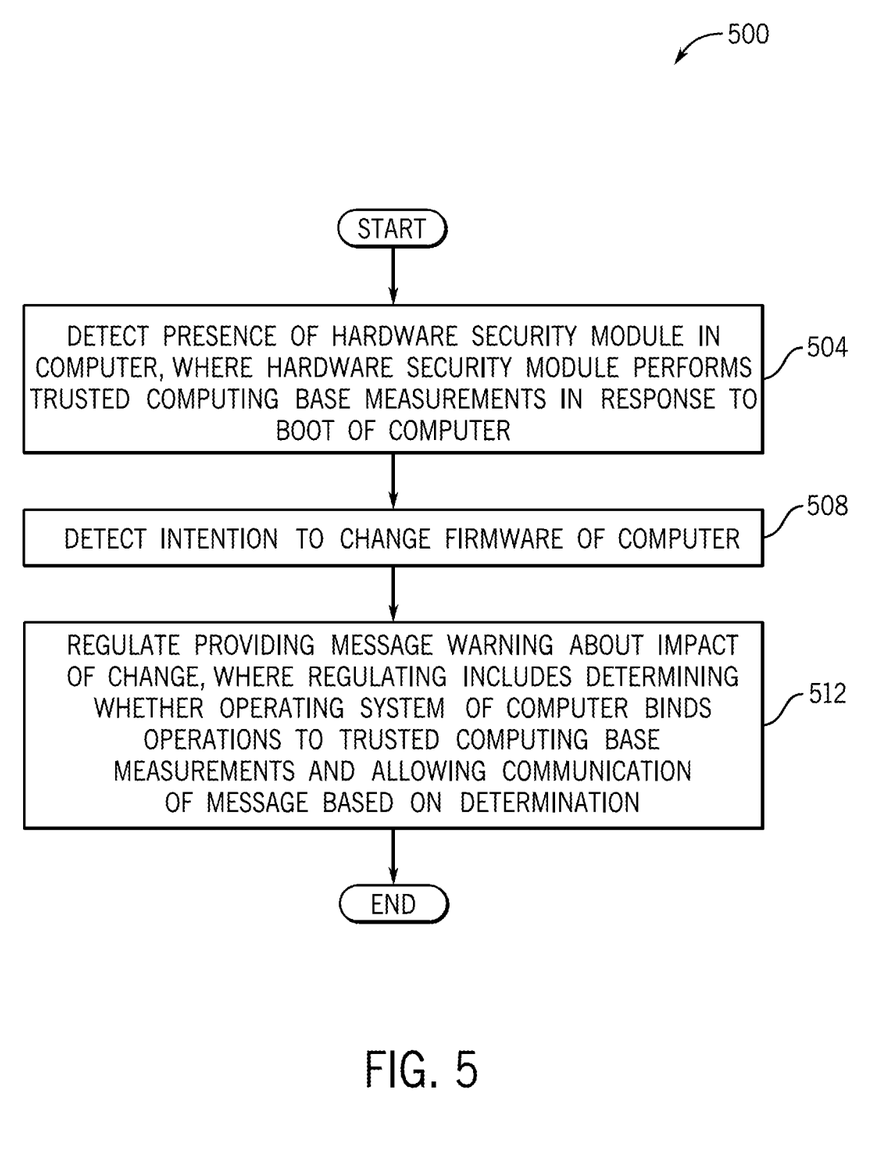
FIG. 5 is a flow diagram depicting a process to regulate providing a message warning about an impact of a change to firmware of a computer system according to an example implementation.

Referring to FIG. 5, in accordance with example implementations, a technique 500 includes detecting (block 504) a presence of a hardware security module in a computer, where the hardware security module performs trusted computing base measurements in response to a boot of the computer. The technique 500 includes detecting (block 508) an intention to change firmware of the computer and regulating (block 512) providing a message warning about an impact of the change. In accordance with example implementations, regulating the providing of the message includes determining whether an operating system of the computer binds operations to the trusted computing base measurements and allow communication of the message based on the determination that the operating system binds operations to the trusted computing base measurements.

Figure 6:
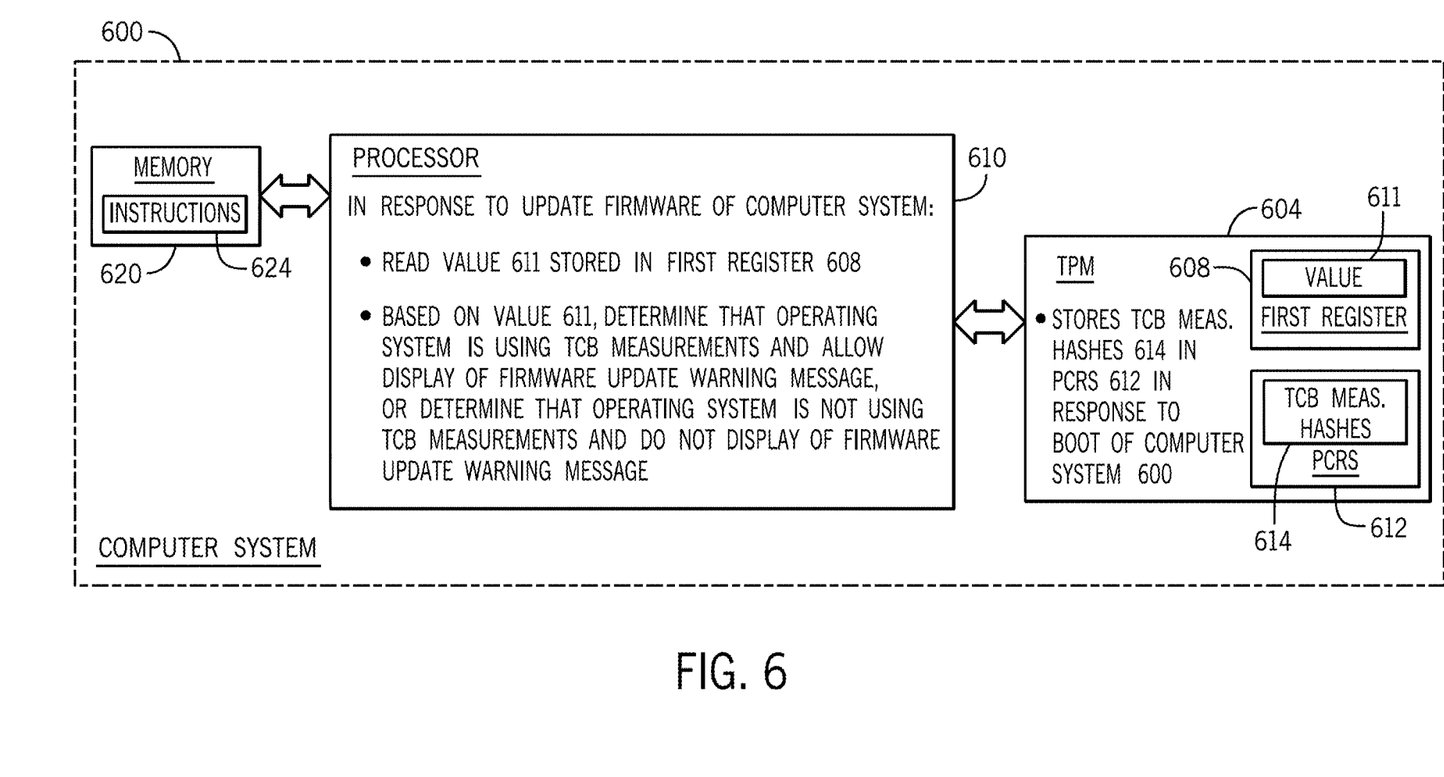
FIG. 6 is a schematic diagram of a computer system that provides data to display a firmware update warning message based on a value stored in a register of a TPM according to an example implementation.

Referring to FIG. 6, in accordance with example implementations, a computer system 600 includes a trusted platform module (TPM) 604; at least one processor 610; and a memory 620. The TPM includes a first register 608 and platform configuration registers 612. The TPM 604 stores measurements of the computer system in the platform configuration register 612 in response to a boot of the computer system 600. The memory 620 stores instructions 624 that, when executed by the processor(s) 610, cause the processor(s) 610 to, in response to a request to update firmware of the computer system 600, read a value 611 that is stored in the first register 608. Moreover, in response to the request to update the firmware of the computer system, the processor(s) 610, based on the value 611, determines that the operating system is using the measurements and allows display of a firmware update warning message; or determines that the operating system is not using the measurements and does not display the firmware update warning message.

Figure 7:
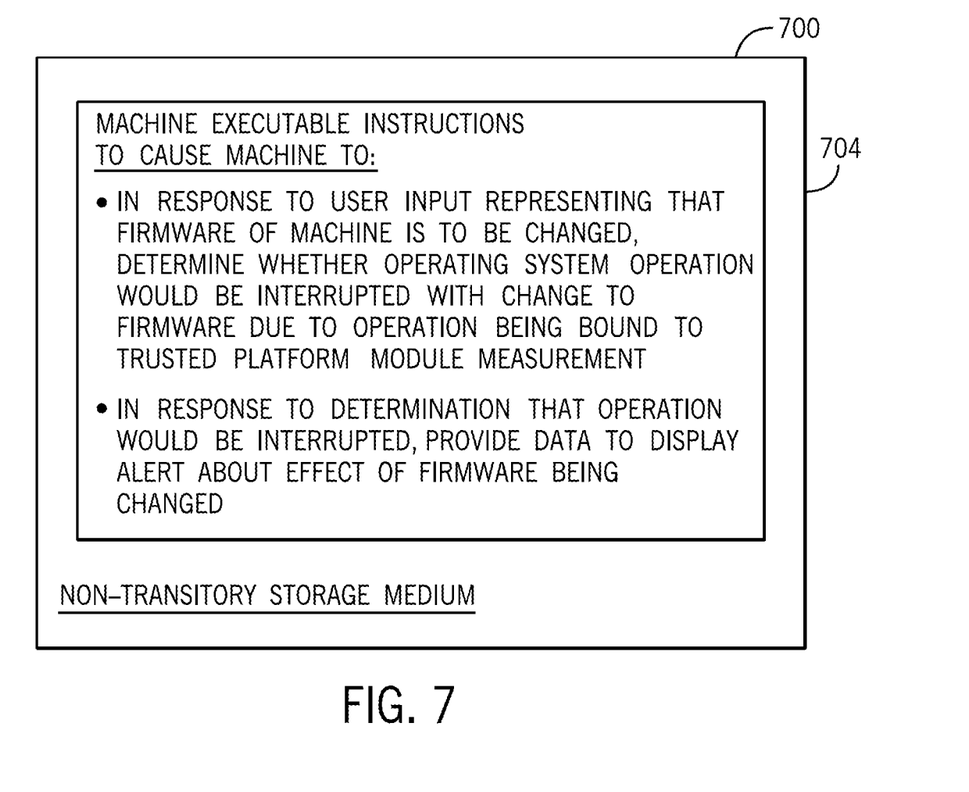
FIG. 7 is an illustration of machine executable instructions to cause a machine to provide data to display an alert about an effect of firmware of the machine being changed based on whether an operating system binds an operation to a TPM measurement according to an example implementation.

Referring to FIG. 7, a machine readable non-transitory storage medium 700 stores instructions 704 that, when executed by a machine, cause the machine to, in response to a user input representing that firmware of the machine is to be changed, determine whether an operating system operation would be interrupted with the change to the firmware due to the operation being bound to a trusted platform module measurement; and in response to the determination that the operation would be interrupted, provide data to display an alert about an effect of the firmware being changed.

In accordance with example implementations, the hardware security module may include a trusted platform module (TPM). A particular advantage is that a warning message may be prevented from being displayed for a computer system in which the TPM has been installed and is detected but is not being used to bind operations of the operating system to trusted computing base measurements.

In accordance with example implementations, performing the detection of the presence of the hardware security module may include determining whether the operating system binds operations to the trusted computing base measurements, and allowing communication of the message in response to a user input launching a firmware update tool. A particular advantage is that a firmware update warning message may be intelligently displayed for the case in which trusted computing base measurements are bound to operating system operations.

In accordance with example implementations, determining whether the operating system binds operations to the trusted computing base measurements includes determining an attribute of a persistent object that is created by the operating system for the hardware security module. A particular advantage is that display or communication of the message may be intelligently regulated to prevent a user from being unnecessarily warned about consequences of a firmware update.

In accordance with example implementations, determining whether the operating system binds operations to the trusted computing base measurements includes determining whether an authorization of the hardware security module has been configured. A particular advantage is that display or communication of the message may be intelligently regulated to prevent a user from being unnecessarily warned about consequences of a firmware update.

In accordance with example implementations, determining whether the authorization value of the hardware security module has been configured includes determining at least one of whether an owner authority has been configured, an endorsement authority has been configured or a lockout authority has been configured. A particular advantage is that, as a first step, a determination may be made whether the trusted computing base measurements are being used to bind operating system measurements in a rather more simplistic manner without involving the comparison of baseline values.

In accordance with example implementations, determining whether the operating system binds operations to the trusted computing base measurements includes comparing a baseline value for register of the hardware security module to a second value for the hardware security module. A particular advantage is that changes to baseline values may be used to identify whether trusted computing base measurements are being used.

In accordance with example implementations, the registers may store at least one of the following: a number of authorization sessions currently loaded into a volatile memory of the hardware security module, a number of additional authorization sessions that can potentially be loaded into the volatile memory of the hardware security module, a number of active authorization sessions currently being tracked by the hardware security module, or a number of additional authorization sessions that can be potentially created. A particular advantage is that selected register values may be analyzed for purposes of inferring operating system use of the trusted computing base measurements.

In accordance with example implementations, the register stores at least one of a number of persistent objects currently loaded into a non-volatile memory of the hardware security module, or a number of additional persistent objects that may potentially be loaded into the non-volatile memory. A particular advantage is that selected register values may be analyzed for purposes of inferring operating system use of the trusted computing base measurements.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   detecting a presence of a hardware security module in a computer, wherein the hardware security module performs trusted computing base measurements in response to a boot of the computer;
   detecting an intention to change firmware of the computer; and
   regulating providing a message warning about an impact of the change, wherein the regulating comprises:
      determining whether an operating system of the computer binds operations to the trusted computing base measurements; and
      allowing communication of the message based on the determination that the operating system binds operations to the trusted computing base measurements.

2. The method of claim 1, wherein the hardware security module comprises a trusted platform module (TPM).

3. The method of claim 1, further comprising performing the detection of the presence of the hardware security module, the determination of whether the operating system binds operations to the trusted computing base measurements, the detection of the intention to change firmware of the computer, and the allowing of communication of the message in response to user input launching a firmware update tool.

4. The method of claim 1, wherein determining whether the operating system binds operations to the trusted computing base measurements comprises determining an attribute of a persistent object created by the operating system for the hardware security module.

5. The method of claim 1, wherein determining whether the operating system binds operations to the trusted computing base measurements comprises determining whether an authorization of the hardware security module has been configured.

6. The method of claim 5, wherein determining whether the authorization value of the hardware security module has been configured comprises determining at least one of whether an owner authority has been configured, an endorsement authority has been configured or a lockout authority has been configured.

7. The method of claim 1, wherein determining whether the operating system binds operations to the trusted computing base measurements comprises comparing a baseline value for a register of the hardware security module to a second value for the hardware security module register.

8. The method of claim 7, wherein the registers stores one of the following: a number of authorization sessions currently loaded into a volatile memory of the hardware security module, a number of additional authorization sessions that can potentially be loaded into the volatile memory of the hardware security module, a number of active authorization sessions currently being tracked by the hardware security module, or a number of additional authorization sessions that can be potentially created.

9. The method of claim 7, wherein the register stores an estimate of a number of additional transient objects that may potentially be loaded into a volatile memory of the hardware security module.

10. The method of claim 7, wherein the register stores one of a number of persistent objects currently loaded into a non-volatile memory of the hardware security module, or a number of additional persistent objects that may potentially be loaded into the non-volatile memory.

11. A computer system comprising:
a trusted platform module (TPM) comprising a first register and platform configuration registers, wherein the TPM to store measurements of the computer system in the platform configuration registers in response to a boot of the computer system;
at least one processor; and
a memory to store instructions that, when executed by the at least one processor, cause the at least one processor to:
in response to a request to update firmware of the computer system:
read a value stored in the first register; and
based on the value:
determine that the operating system is using the measurements and allow display of a firmware update warning message; or
determine that the operating system is not using the measurements and do not display the firmware update warning message.

12. The computer system of claim 11, wherein the instructions, when executed by the at least one processor, cause the at least one processor to determine that the operating system is using the measurements and, in response to a user input, proceeding with the update of the firmware.

13. The computer system of claim 11, wherein:
the value comprises an owner authorization value, an endorsement authorization value, or a lockout authorization value; and
the instructions, when executed by the at least one processor, further cause the at least one processor to determine that the operating system is using the measurements based on detection of the value being configured.

14. The computer system of claim 11, wherein the instructions, when executed by the at least one processor, further cause the at least one processor to compare a baseline value stored in the first register with a second value stored in the register to determine whether the operating system is using the measurements.

15. The computer system of claim 14, wherein the first register stores a value representing one of the following: a number of authorization sessions currently loaded into a volatile memory of the TPM, a number of additional authorization sessions that may potentially be loaded into the volatile memory, the number of active authorization sessions currently being tracked by the TPM, the number of additional authorization sessions that may be potentially created, an estimate of the number of additional transient objects that may be potentially loaded into the volatile memory, a number of persistent objects currently loaded into a non-volatile memory of the TPM, or a number of additional persistent objects that may potentially be loaded into the non-volatile memory.

16. A machine readable non-transitory storage medium that stores instructions that, when executed by a machine, cause the machine to:
in response to a user input representing that firmware of the machine is to be changed, determine whether an operating system operation would be interrupted due to the operation being bound to a trusted platform module measurement; and
in response to the determination that the operation would be interrupted, provide data to display an alert about an effect of the firmware being changed.

17. The storage medium of claim 16, wherein the operation comprises an operation to provide a hard disk encryption key based on the trusted platform module measurement.

18. The storage medium of claim 16, wherein the instructions, when executed by the machine, further cause a firmware update tool to compare a value of a register of a trusted platform module of the machine captured before loading of the operating system to a value of the register after loading of the operating system.

19. The storage medium of claim 16, wherein the instructions, when executed by the machine, further cause the machine to determine that the operation would not be interrupted, and the machine uses a trusted platform module of the machine for a non-measurement operation.

20. The storage medium of claim 19, wherein the non-measurement operation comprises an operation to encrypt or decrypt a file, a self-test operation, an encryption or decryption service, an operation to generate a random number, or an operation to compute a hash.

* * * * *